J. W. SNEDEKER.
MACHINE FOR SECURING WEBBING TO FRAMES.
APPLICATION FILED JULY 24, 1914.

1,152,565.

Patented Sept. 7, 1915.
10 SHEETS—SHEET 1.

Fig. 1.

Witnesses
E. R. Barrett
Hugo W. Kreinbring

Inventor
James W. Snedeker.
By Edward N. Pagelsen,
Attorney

J. W. SNEDEKER.
MACHINE FOR SECURING WEBBING TO FRAMES.
APPLICATION FILED JULY 24, 1914.

1,152,565.  Patented Sept. 7, 1915.
10 SHEETS—SHEET 10.

Witnesses
E. R. Barrett
Hugo W. Kreinbring

Inventor
James W. Snedeker.
By Edward N. Pagelsen,
Attorney

UNITED STATES PATENT OFFICE.

JAMES W. SNEDEKER, OF ADRIAN, MICHIGAN.

MACHINE FOR SECURING WEBBING TO FRAMES.

1,152,565.      Specification of Letters Patent.      Patented Sept. 7, 1915.

Application filed July 24, 1914. Serial No. 852,825.

*To all whom it may concern:*

Be it known that I, JAMES W. SNEDEKER, a citizen of the United States, and a resident of Adrian, in the county of Lenawee and State of Michigan, have invented a new and Improved Machine for Securing Webbing to Frames, of which the following is a specification.

This invention relates to means for securing the ends of cross wires or rods to the side bars of gates or other frames, and its object is to provide devices for quickly and closely bending the outer portions of the cross wires around the bars of the frame and then fastening the ends of the wires by twisting them around the main portions of the wires.

This invention consists in the combination of novel means for tightly stretching parallel wires, novel means for bending the wires around transverse bars, and novel twisters for securing the free ends around the main portions of the wires.

It further consists in the details of construction illustrated in the accompanying drawings and particularly pointed out in the claims.

In the accompanying drawings.

Similar reference characters refer to like parts throughout the several views.

Gates which are to be used with wire fences are usually in the form of rectangular frames, sometimes provided with cross bars or other braces, and often formed of tubing with the end bars usually parallel, as are also the top and bottom bars. The wire fabric extending between the bars of the frames is often of the same construction as the fence with which the gate is to be used. In the present case, the wire fabric is the same as that shown in the patent to Cornell, Number 1,105,622, dated August 4th, 1914, although any other desired fabric can be secured in position by means of this machine, so long as it is provided with longitudinal ends which may be bent around the end bars of the gate frame. Cross or picket wires are not necessary although desirable.

Figure 24:
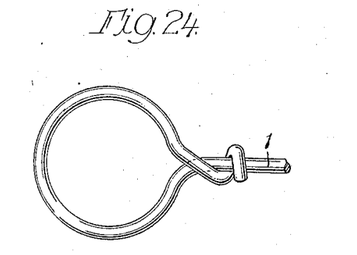
Fig. 24 is a view of a completed loop.

In the operation of this machine, a piece of wire fabric of proper length, consisting of longitudinal wires 1 and preferably of transverse wires 2, is placed in the machine and the extending portions of the wires 1 are engaged by clamps, after which these wires are tensioned. A gate frame consisting of the end bars 3 and top and bottom bars 4 is then laid on the fabric. The portions of the wires 1 that extend beyond the bars 3 are then carried to the position shown in Fig. 16 by means of the benders, after which the twisters act on the ends of the wires until the wraps shown in Fig. 24 are obtained. Small loops 5 may be secured by hand between the wires 1 and the bars 4 before the finished gate is removed from the machine. The twisters are operated by racks that move in one direction to turn the twisters and in the opposite direction during the time the finished gate is being removed and before a new frame is placed in position, to return the twisters to normal position.

The bed of this machine may be made of sufficient length to accommodate gates of practically every length that may be desired, and consists of I-beams 7 connected by cross bars 8. On the upper flanges of the I-beams are secured the racks 9 with which the gears 10 are in mesh. These gears are secured, in pairs, on the shafts 12, mounted in the upright headstocks 13, which are slidable on the bed when the shafts 12 and gears 10 are turned by means of the cranks 14 to adjust the machine for gates of different lengths. Gibs 15 can be tightened against the flanges of the I-beams to lock the headstocks in place.

On the headstocks 13 are the bearings 16 for the shafts 17 on which are secured the eccentrics 18 and the crank handles 19. The upper ends of the headstocks are formed with dovetail grooves to receive the shoes 20 on the lower sides of the ends of the cross bars 22. As the two ends of the machine are the same, one only need be described. Lugs 23 extend upwardly from the cross bars 22 on both sides of the eccentrics 18 so that each cross bar will be moved in or out when its shaft is turned. Supporting bars, preferably of telescoping tubes 24 and 25, may be mounted on the shafts 17 to support the wire fabric.

Figure 1:
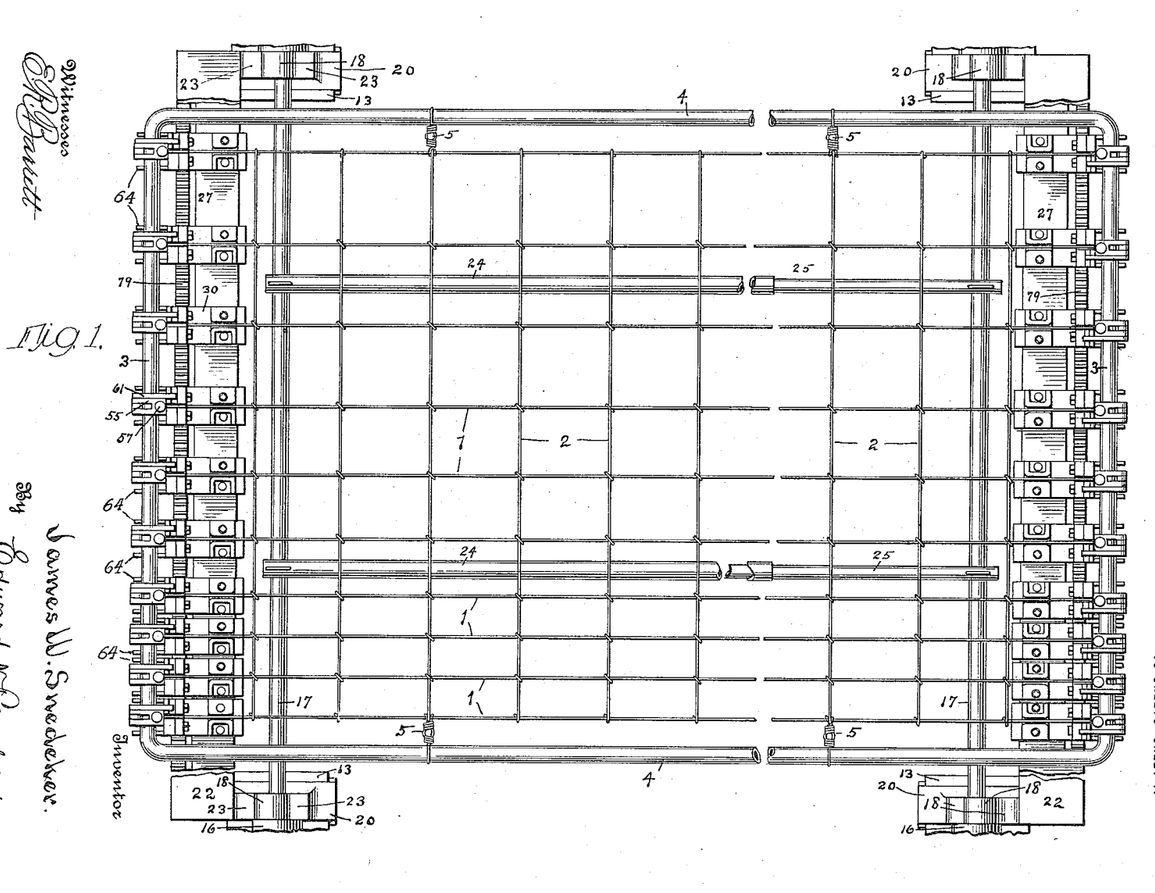
Figure 1 is a plan of this improved machine, the driving mechanism being omitted for the sake of clearness.
Figures 14, 15, 25:
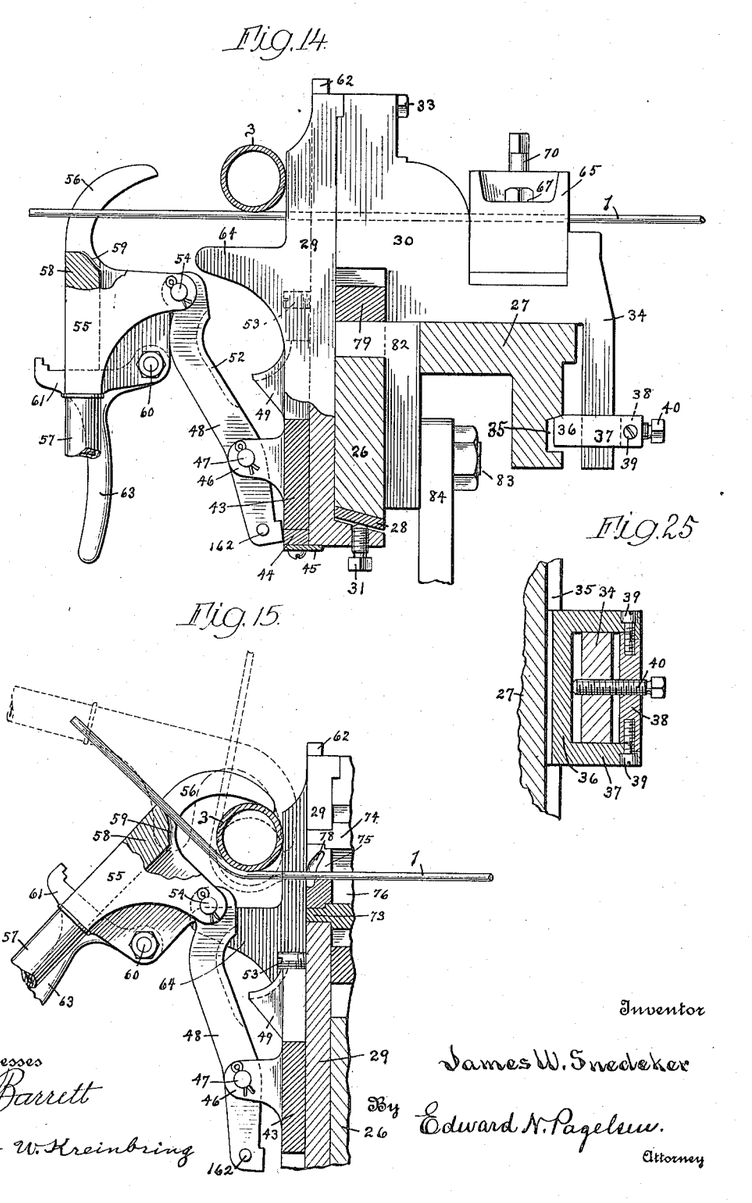
Figs. 14, 15 and 16 are views illustrating the action of the benders.
Fig. 25 is a section of a securing device for the bender frames.

As indicated in Fig. 1, there is a bender and a twister for each end of each wire 1, the benders and twisters being mounted in small frames firmly secured to the cross bars 22. The cross bar is formed of a vertical plate 26 and an angle plate 27, as shown in Fig. 14. The lower edge of the plate 26 is beveled and engaged by the gib 28 under pressure of the set screw 31 of each frame for each bender and twister. The separate frames are each formed with an outer plate 29 and an inner portion 30 secured together by screws 33. The inner edge of each frame is formed with an arm 34 that extends down across the angle plate 27 of the cross bar, which angle plate is formed with a groove 35 to receive the gib 36 which has side pieces 37 that connect to the front bar 38 by screws 39. These side pieces are slidable in proper grooves in the arm 34. A screw 40 is threaded in the arm 34 and engages the gib 36 to force it into engagement with the inclined upper side of the groove 35, and thus, in connection with the screws 33, holds the bender frame in position.

Figures 16, 17, 18:
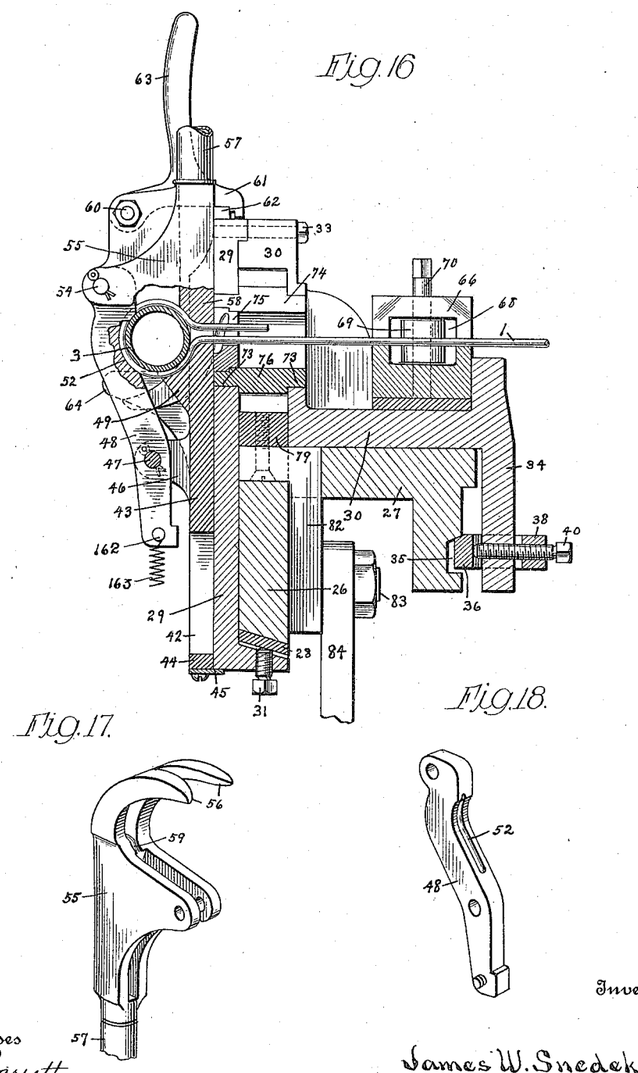
Figs. 17 and 18 are details of the benders.

*The benders.*—The front plate 29 of each bender frame is formed with vertical guides 42 between which the shoe 43 is vertically slidable. A small bar 44 may be held across between the lower ends of these guides by means of a plate 45. On the shoe are the lugs 46 that carry the pin 47 on which the link 48 is mounted. An inclined projection 49 on this shoe is provided with a groove 50 to receive the wire 1, as hereafter explained. The link 48 is also provided with a groove 52 to receive the wire. A screw 53 limits the upward movement of the shoe. The link 48 carries a pin 54 at its upper end which supports the lever 55 having the claws 56, the handle 57 and the wire-engaging central portion 58, having a groove 59. On this lever is a pin 60 on which is mounted a latch 61 adapted to engage over the lip 62 on the frame 29 and having a handle 63 to release it. On the inner portion 30 of the bender frame are two abutments 65 and 66, connected at their lower portions and secured in position by means of the screw 67, the abutment 66 having a pocket 68, as shown in Fig. 16, in which is an eccentric 69, mounted on the shaft 70 that is provided with a squared upper end so that it can be engaged by a proper tool. The elevated parts of the portions 29 and 30 of the bender frame are formed with deep slots 72 to receive the wires 1.

The operation of the parts thus far described is as follows: The fabric being prepared, it is laid on the cross bars 24—25 with the ends of the wires 1 lying in the deep grooves 72 and between the abutments 65 and 66. The small shafts 70 are then turned so that the eccentrics 69 may tightly grip the wires. The shafts 17 are then turned by means of the crank handles 19 to the positions shown in Fig. 2, which forces the cross bars 22 outwardly and with them all of the abutments 65 and 66, thus tensioning all the wires 1. The gate frame is now laid on the fabric with the end bars 3 outside of the cross bars 22. A handle 57 of a bender at the end of a row is then swung up by the operator of the machine. If two men are employed, one may work at each end, starting with the bender at either end of the row. At the beginning, the parts will be as seen in Fig. 14, with the wires 1 between the claws 56 and the tube 3 resting on the wires. The handle 57 is then swung up until the ends of the claws 56 rest on the tube 3, the part 58 of the lever engaging the wire and beginning to bend it. At the same time, the shoe 43 is beginning to move up. This brings the parts to the positions shown in solid lines in Fig. 15. Further movement of the lever 55 carries the shoe 43 into engagement with the screw 53 and then forces down the tube 3, as indicated by dotted lines in Fig. 15. When the lever 55 has reached the position shown in Fig. 16, the tube 3 will have been forced down so low that the loop of wire around it will lie in the groove 50 in the projection 49 on the shoe, and the link 48 will have been pulled in so that the wire 1 lies in the groove 52 in this link. The downward position of the tube 3 is limited by the fingers 64 projecting from the front plates 29. At the same time, the intermediate portion 58 of the lever will have brought the end of the wire down until it is substantially parallel to or in engagement with the main portion, and the latch 61 will have engaged over the lip 62. The benders are all brought to this position, after which the twisters are set in motion. As the shoes 43 are in engagement with the screws 53, the bar 3 is in engagement with the fingers 64, the levers 55 are in engagement with the top of the bar 3, the bar 3 cannot possibly move and the ends of the wires can be wrapped around the main portions of the wires.

Figure 3:
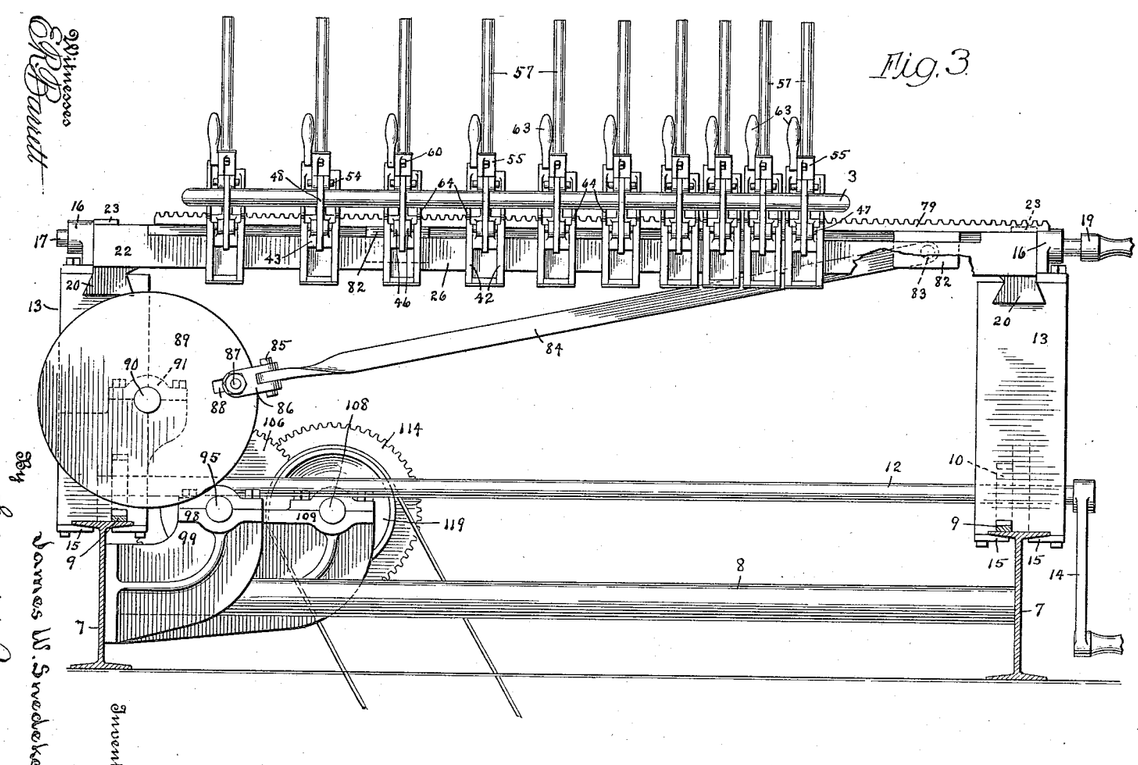
Fig. 3 is an elevation of the left end of the machine.
Figure 10:
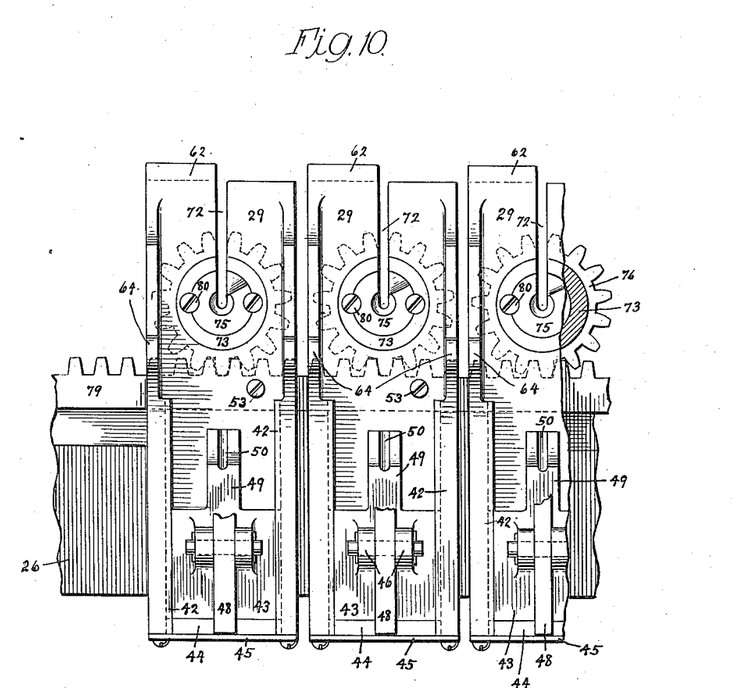
Fig. 10 is an elevation of the frames for supporting the benders and twisters.
Figure 11:
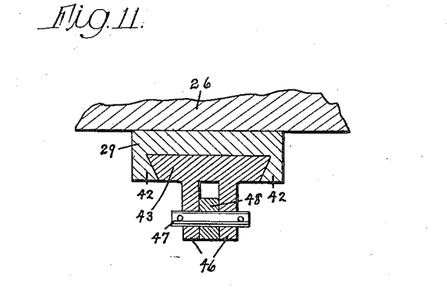
Fig. 11 is a section of a shoe of a bender.
Figure 19:
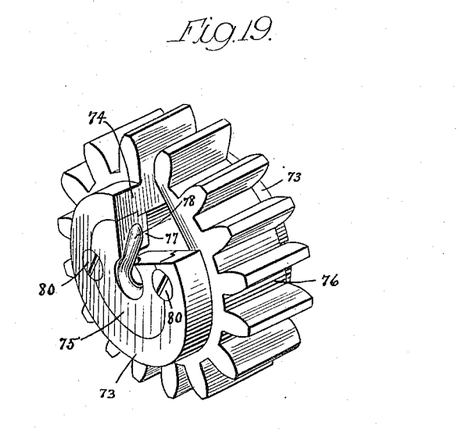
Fig. 19 is a perspective view of one of the twister gears.
Figure 20:
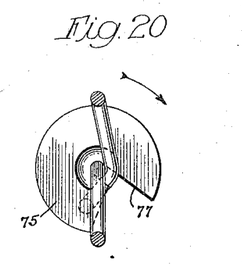
Figs. 20 to 23 inclusive are views indicating the action of the twisters.
Figure 21:
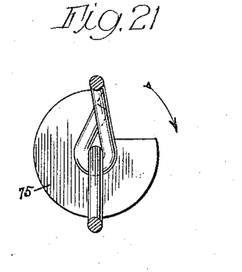
Figure 22:
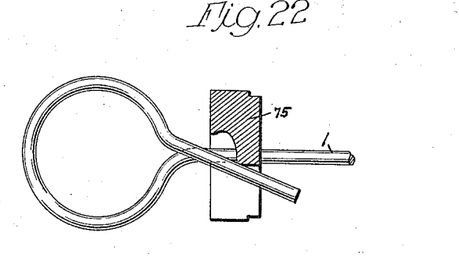
Figure 23:
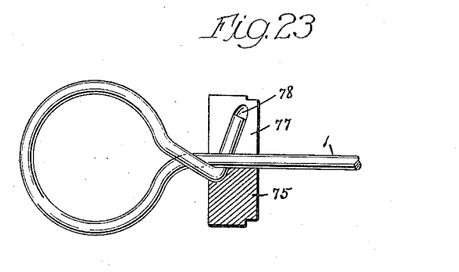

*The twisters.*—Mounted in bearings formed in the outer portion 29 and inner portion 30 of each bender frame is a small gear 76 having journal hubs 73 at each end, as shown in Fig. 19. The gear is hollow and has a slot 74 to permit the return end of the wire 1 to be bent down, the slot 74 always being upright during the operation of the bender, as shown in Figs. 10 and 16. In the counterbored outer hub of the gear is mounted a twisting die 75, secured in position in any desired manner, screws 80 preferred. This die is somewhat more than three-fourths of a circle, as shown in Fig. 19, with a central hole that is enlarged at its outer end. One wall 77 is formed with a groove 78 to receive the end of the wire 1 as it is being twisted around the main portion of wire. After the benders have all been operated to bring the ends of the wires 1 to the position shown in Fig. 16, the gears are turned by moving the rack bar 79 away from the observer in that figure, thus turning the gears and their dies 75 as shown in Figs. 20 to 23. The first one-third revolution will bend the ends of the wires to the positions shown in Figs. 20 and 22. The first full revolution results as indicated in Figs. 21 and 23, the end of the wires being in the groove 78, while a second complete revolution leaves the wires as shown in Fig. 24, free from the walls of the twisting dies. The parts are so proportioned that these gears will make at least two full revolutions and stop with their slots 74 upright so that the wires 1 can be lifted out after being secured to the gate frame. The two rack bars 79 are reciprocated together to turn the gears 76. Each is mounted on a plurality of shoes 82 which are slidable between the parts 26 and 27 of the cross bars 22, as shown in Figs. 3 and 16. On each shoe 82 at the front of the machine is mounted a pin 83 that connects to the pitman 84, whose rear end connects to the pin 85 carried by the cross link 86, which, in turn, is mounted on the crank pin 87, adjustably mounted in the slot 88 in the crank disk 89 secured to the shaft 90. This shaft is mounted in bearings 91 in its headstock 13. Means are provided for turning this shaft one-half revolution from the position shown in Fig. 3 so as to give the gears 76 two full turns through the operation of the rack bar 79 and then to hold the parts from movement until the finished gate is removed, after which the crank disk 89 is given another half-revolution to move the rack bar and gears to starting position.

Figure 9:
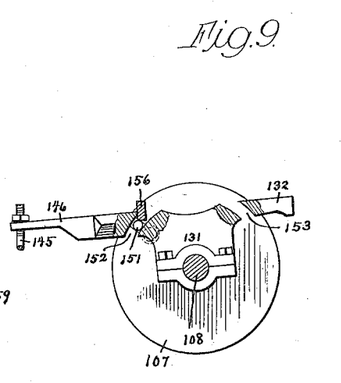

*The driving mechanism.*—Secured to each of the shafts 90 is a gear 93 which meshes with the gear 94, slidable upon but revoluble with the main shaft 95. The gear 93 is provided with a well known stop plate 96 which is engaged by the segment 97 connected to the gear 94, the gears being so proportioned that the shaft 90 will make one-half-revolution during about two-thirds of a revolution of the shaft 95 and remain at rest during the other third of a revolution. This shaft 95 is mounted in bearings 98 carried by brackets 99 and 100. Secured to the shaft 95 is the gear 102, and on this shaft are revolubly mounted the pinions 103 and 105 and the gears 104 and 106. The pinion 103 is connected to the gear 104 while the pinion 105 is connected to the gear 106. On this shaft is also secured the disk 107. A shaft 108 is mounted in bearings 109 also carried by the brackets 100 and on it is secured the disk 112 and the pinion 113 which meshes with the gear 106. Loose on the shaft 108 are the gears 114 and 116 and the pinions 115 and 117. The gear 114 is connected to the pinion 115 and the gear 116 with the pinion 117. In this manner a very powerful driving gearing is obtained to drive the shaft 95 at low speed. A pulley 119 is loose on the shaft 108 and has several laterally projecting pins 120. See Figs. 5 to 9 inclusive. A crank arm 122 is secured to the shaft 108 adjacent the disk 112 and a pin 123 is mounted in the outer end of this arm. On this pin is mounted a pawl 124, a dog 125, and an arm 126 that connects to a spring 127 which extends from the pin 128 and normally swings the pawl 124 out into the path of the pins 120 on the pulley. The face of the disk 112 has a depression 129 to receive the pin 128, spring 127, arm 126 and dog 125, as well as a portion of the arm 122. Loosely mounted on the shaft 95 is a plate 131, having an arm 132 whose outer end normally rides on the periphery of the disk 112. But when the depression 129 reaches this arm, the end thereof may move into the path of the dog 125, stopping it, together with the crank arm 122 and shaft 108, at the same time swinging the pawl 124 inwardly out of the path of the pins 120. The means for lifting this arm 132 out of engagement with the dog 125 to permit the spring 127 to swing the pawl 124 into the path of these pins 120 is as follows. See Figs 2 and 4 to 9 inclusive. A pin 134 is carried by a headstock 13 or any other desired part of the machine, and on it is mounted a lever 135, whose lower end engages a pin 136 on a sleeve 137, adjustably mounted on the rod 138. This rod connects to a pin 139 on the arm 140 of a bell-crank, mounted on the pin 142 on the bed 7. The other arm 143 carries a pin 144 to which connects the lower end of a rod 145 that connects to the arm 146 also connected to the plate 131 and practically in line with the arm 132. On the arm 146 is a triangular ridge 147 that engages with the V-shaped detent at the upper end of the spring 148, carried by the bracket 149 on the bed 7. When this arm 146 is swung up or down, the ridge 147 is forced past this detent, which, in turn, prevents the movement of the arms 146 and 132 except by considerable force. The arm 146 is swung down and the arm 132 is swung up by means of the lever 135 to permit the mechanism to start, but automatic means are provided for stopping the mechanism after the disk 107 and shaft 108 have made one complete revolution. A pin 151 is mounted on this disk 107 and may pass through the grooves 152 and 153 in the adjacent faces of the plate 131 and arms 132 and 146, which grooves are made use of merely to render the construction more compact. Projecting from the arm 146 (to the right in Figs. 2 and 5), are two lugs 154 that carry the pin 155 on which the lever 156 is mounted. One end of this lever extends into the groove 152, as indicated in Fig. 9, and the other rests on the adjustable post 158, mounted on the bracket 159, as shown in Figs. 2, 5, 7 and 8. When the disk 107 and the shaft 95 are completing one revolution, after the shaft 90 has completed one half-revolution, the pin 151 passes up through the groove 152 and engages the adjacent end of the lever 156, raising it. As the support 158 is a fulcrum of this lever, the pin 155 will be lifted by the pin 151 and with it, the arm 146. This causes the arm 132 to be depressed into the recess 129 in the disk 112, and into the path of the dog 125, and also causes the pawl 124 to be swung out of the path of the pins 120, and therefore causes the machine to stop. It is evident that as this stopping occurs when the pin 151 has reached a certain predetermined position with respect to the arm 146, that the rack-bars 79 will stop at both ends of their strokes, and always at the same places, thus insuring the stoppage of the gears 76 with their slots 74 vertical.

Many changes can be made in the details of construction of this machine without departing from the spirit of my invention. Thus any other desired driving mechanism may be employed so long as it will move the rack-bars through exactly one full stroke and then hold them in such positions until it is desired that they shall make the next stroke. In fact, any other desired mechanism may be employed to turn the twisters the proper number of full turns in one direction, and then, after the desired interval, turn them back again to starting position.

When it is desired to adapt this machine for fabrics whose longitudinal wires are spaced farther apart than shown in Fig. 1, the screws 31 and 40 are withdrawn and the gibs 28 removed, which permits the bender frames to be lifted sufficiently to disengage the teeth of the gears 76 from those of the rack bars 79. The bender frames are then shifted to the desired positions, but the distances that they are moved must always be a multiple of the pitch of these teeth in order that the slots in the gears 76 may always be parallel.

Figure 2:
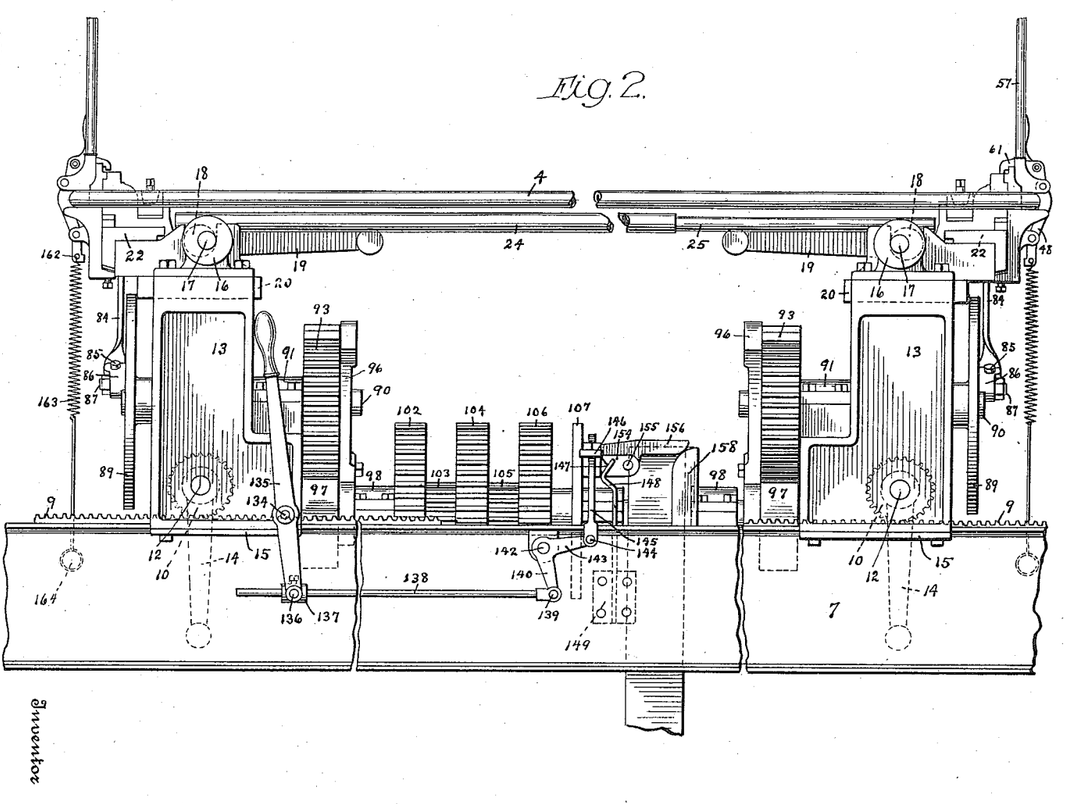
Fig. 2 is a rear elevation of the machine.

In order that the benders may quickly fall to the positions shown in Fig. 14, springs 163 may be connected to the pins 162 in the lower ends of the links 48 and to the cross bars 164 as indicated in Fig. 2.

Figure 4:
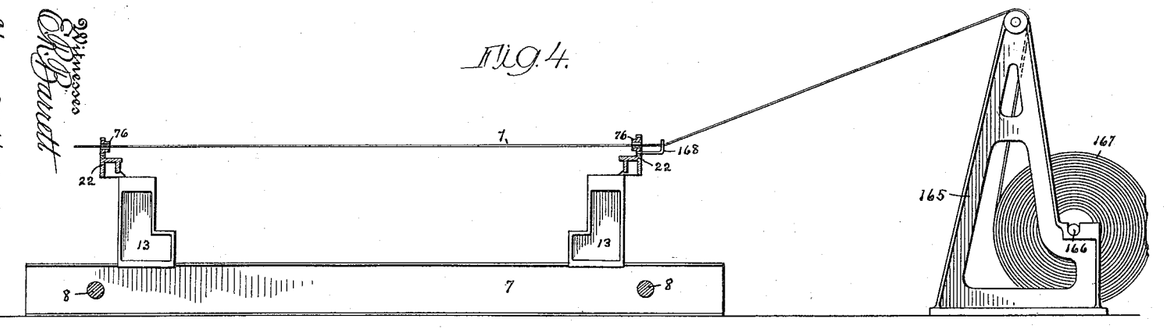
Fig. 4 is a diagrammatic front elevation.
Figure 5:
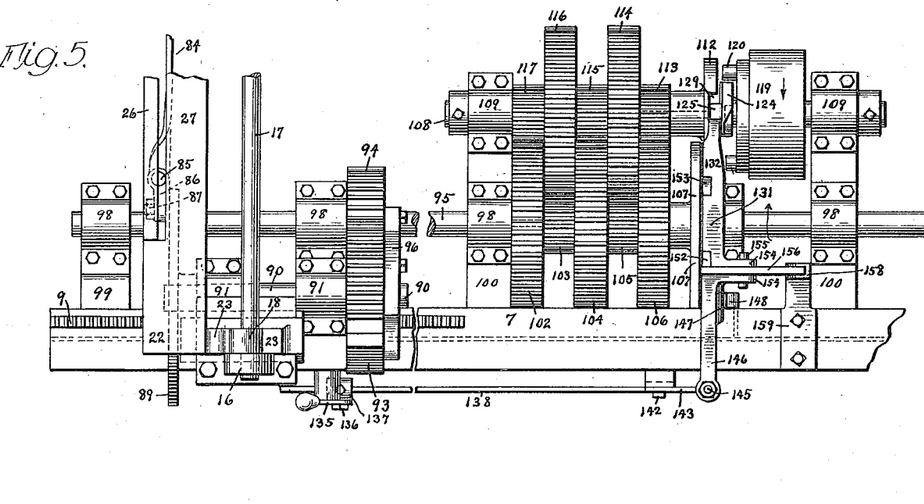
Fig. 5 is a plan of the driving mechanism.
Figure 6:
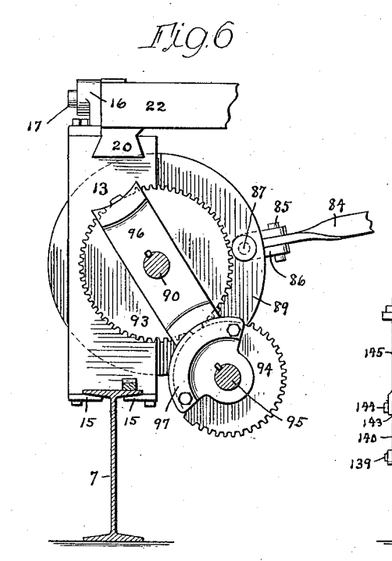
Figs. 6 to 9 inclusive are details of the controlling devices of the driving mechanism.
Figure 7:
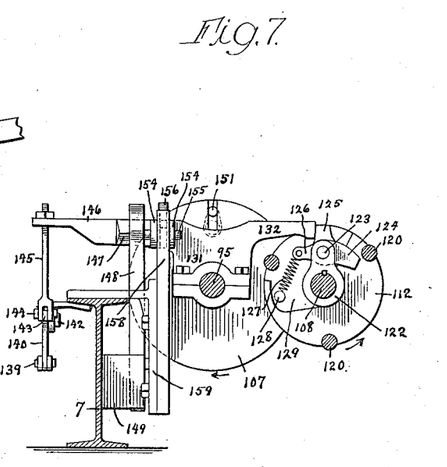
Figure 8:
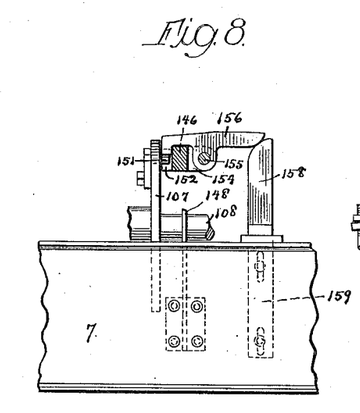

While it may be desirable to cut the fabric in proper lengths previous to bringing it to this machine, a frame 165, shown in Fig. 4, may be employed to support the shaft 166 on which the roll 167 of the fabric is wound. This fabric may then pass over a roller at the top of the frame and thence to the machine, a guide 168 being provided to permit the operators to cut the wires 1 to exactly the desired length.

Figure 12:
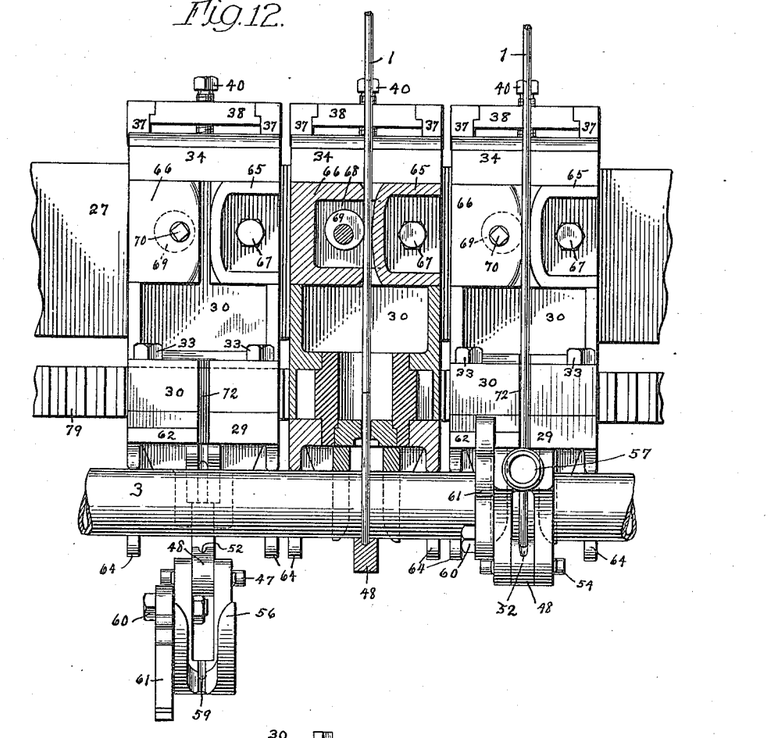
Fig. 12 is a plan of the supporting frames for the benders and twisters.
Figure 13:
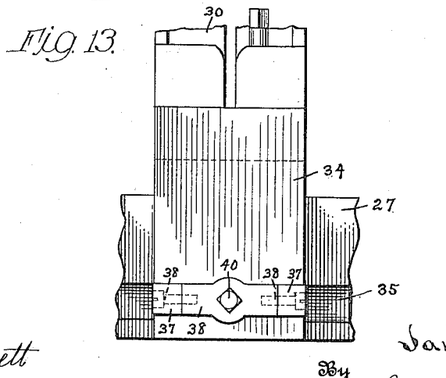
Fig. 13 is an elevation from the inside of the machine of one of these frames.

In tightening the eccentrics 69 onto the wires 1, they should be turned to the left (in Fig. 12), so that, when they are moved outwardly by means of the crank handles 19, the pull of the wires 1 will serve to tighten them still more. After the twisters have operated, the benders are swung down to original position, and the cross bars and bender frames moved back. The resulting inward pressure on the wires 1 will result in the eccentrics being turned to the right, thus releasing the wires 1.

I claim:—

1. In a machine for securing transverse wires to frames, the combination of a plurality of headstocks, a cross bar mounted thereon, means on the cross bar for engaging the wires, means for moving the cross bar to tension the wires, benders to wrap the wires around the frame, and means to wind the ends of the wires around the main portions thereof.

2. In a machine for securing transverse wires to frames, the combination of a plurality of headstocks, a cross bar mounted thereon, means on the cross bar for engaging the wires, means for moving the cross bar to tension the wires, benders to wrap the wires around the frame, gears and twisters mounted therein to wind the ends of the wires around the main portions thereof, and means to revolve the gears.

3. In a machine for securing transverse wires to frames, the combination of a plurality of headstocks, a cross bar mounted thereon, bender frames mounted on the cross bar, eccentrics on the bender frames for engaging the wires, means for moving the cross bar to tension the wires, benders to wrap the wires around the frame, and means to wind the ends of the wires around the main portions thereof.

4. In a machine for securing transverse wires to frames, the combination of a plurality of headstocks, a cross bar mounted thereon, bender frames mounted on the cross bar, engaging devices on the bender frames for engaging the wires, means for moving the cross bar to tension the wires, benders to wrap the wires around the frame, gears revolubly mounted in the bender frames, dies mounted in the gears to wind the ends of the wires around the main portions thereof, and a rack-bar to simultaneously revolve said gears.

5. In a machine for securing transverse wires to gate frames, the combination of a plurality of headstocks, a bed on which the headstocks are adjustably mounted, a cross bar mounted on the headstocks, benders to wrap the wires around the gate frame, and means to wind the ends of the wires around the main portions thereof.

6. In a machine for securing transverse wires to gate frames, the combination of a plurality of cross bars, means for supporting the bars, benders mounted on the cross bars to wrap wires around the gate frames, and means to wrap the ends of the wires around the main portions thereof.

7. In a machine for securing transverse wires to gate frames, the combination of a bed, headstocks movably mounted thereon in pairs, means for moving the headstocks on the bed, a cross bar movably mounted on each pair of headstocks, bender frames mounted on each cross bar, means mounted on each bender frame to engage the wires, means mounted on the headstocks to move the cross bars to tension the wires, a bender mounted on each frame to wrap a wire around the gate frame, and means mounted on each bender frame to wind the end of the wire around the main portion thereof.

8. In a machine for securing transverse wires to gate frames, the combination of a bed, headstocks movably mounted thereon in pairs, means for moving the headstocks on the bed, a cross bar movably mounted on each pair of headstocks, bender frames mounted on each cross bar, means mounted on each of the bender frames to engage the wires, means mounted on the headstocks to move the cross bars to tension the wires, a bender mounted on each frame to wrap a wire around the gate frame, a gear mounted in each bender frame, a rack-bar mounted on each cross bar to actuate the gears, and a twister die in each gear to wind the end of the wire around the main portion thereof.

9. In a machine for securing transverse wires to frames, the combination of a plurality of headstocks, a cross bar mounted thereon, bender frames mounted on the cross bar, engaging devices on the bender frames for engaging the wires, means for moving the cross bar to tension the wires, benders to wrap the wires around the frame, gears revolubly mounted in the bender frames, dies mounted in the gears to wind the ends of the wires around the main portions thereof, a rack-bar to simultaneously revolve said gears, and intermittently operating means for moving the rack-bar in one direction to turn the gears to wind the wires and in the opposite direction to return the gears to normal position.

10. In a machine for securing transverse wires to gate frames, the combination of a cross bar and means to support the same, a bender frame mounted on the cross bar and having vertical guides, a shoe slidable in the guides and having a wire engaging member, a link pivotally mounted on the shoe, a lever mounted on the link and having portions to engage the gate frame and force it down against the wire and another portion to engage the wire and wrap it around the gate frame, and means to twist the end of the wire around the main portion and thus form a loop around the gate frame.

11. In a machine for securing transverse wires to gate frames, the combination of a cross bar and means to support the same, means to support the wires and the frame resting thereon, a bender frame, means thereon to engage one of the wires, means to move the cross bar to tension the wire, vertical guides formed on the bender frame, a shoe slidable between the guides, members supported on said shoe to force down the gate frame and the wire against a portion of said members and then wrap said wire around the frame, and means to secure the free end of the wire.

12. In a machine for securing transverse wires to gate frames, the combination of a cross bar and means to support the same, means to support the wires and the gate frame resting thereon, a bender frame, a pair of abutments mounted thereon, an eccentric revolubly mounted in one abutment and adapted to engage a wire and force it against the other abutment, a wire bender mounted on the bender frame and adapted to wrap the wire around the gate frame, and means to wind the end of the wire around the main portion thereof.

13. In a machine for securing transverse wires to gate frames, the combination of a plurality of cross bars, means for supporting the bars, benders mounted on the cross bars to wrap wires around the gate frames, and means to wrap the ends of the wires around the main portions thereof, said means comprising hollow gears, each having a slot through its wall to permit the passage of the wire, a twister die mounted in one end of the gear and adapted to engage the end of a wire and wind it around the main portion thereof; and means to revolve said gears.

14. In a machine for securing transverse wires to gate frames, the combination of a plurality of cross bars, means for supporting the bars, benders mounted on the cross bars to wrap wires around the gate frames, and means to wrap the ends of the wires around the main portions thereof, said means comprising hollow gears, each having a hub at each end and a slot through its wall to permit the passage of the wire, a bearing for the hubs of the gears, a twister die mounted in one end of each gear adapted to engage the ends of the wires after being positioned by the benders and to wind the same around the main portions of said wires, and means for revolving all the gears simultaneously.

15. In a machine for securing wires to gate frames, the combination of a support, a bender frame mounted thereon and provided with a slot to receive the wire, a gripping device mounted on the frame adapted to secure the wire to the frame, a vertically movable shoe mounted on the frame, a lever mounted on the shoe adapted to engage the wire and bend it around a gate frame, a latch to hold the lever and wire in position after the wire is bent around the gate frame, and means for winding the end of the wire around the main portion thereof.

16. In a machine for securing wires to gate frames, the combination of a support, a bender frame mounted thereon and provided with a slot to receive the wire and extensions to support the gate frame, a shoe vertically slidable on the bender frame and having a projection adapted to force the wire against the gate frame, a link mounted on the shoe and adapted to engage the wire and force it against the gate frame, a lever mounted on the link and adapted to engage the gate frame to force it against the extensions on the shoe and the end of the wire to force it against the gate frame and back into the slot in the bender frame, and means to wind the end of the wire around the main portion thereof.

17. In a machine for securing wires to gate frames, the combination of a support, a bender frame mounted thereon and provided with a slot to receive the wire and extensions to support the gate frame, a shoe vertically slidable on the bender frame, and a link and a lever mounted on said shoe, adapted, when the lever is swung up, to wrap the wire around the gate frame, the extensions on the bender frame serving to limit the downward movement of the gate frame.

18. In a gate machine, the combination of a bed, a cross bar at each end thereof, adjustable means mounted on the bed to support the cross bars, means mounted on the cross bars to engage the ends of longitudinal wires, means to support a gate frame, means to wrap the outer portions of the longitudinal wires around the frame, and means to twist the ends of the wires around the main portions, said means comprising a revoluble slotted gear for each wire, and a rack to turn said gears.

19. In a machine for securing transverse wires to frames, the combination of means to support the frames, means for causing relative movement between the ends of the wires and the frame, means for wrapping the wires around the frame, and means to wind the ends of the wires around the main portions thereof.

20. In a machine for securing transverse wires to frames, the combination of means to support the frames, means for tensioning the wires, means for wrapping the wires around the frame, and means for connecting the ends of the wires to the main portions thereof.

In testimony whereof I have signed this specification in the presence of two subscribing witnesses.

JAMES W. SNEDEKER.

Witnesses:
  HUGO W. KREINBRING,
  L. M. SPENCER.

Copies of this patent may be obtained for five cents each, by addressing the "Commissioner of Patents, Washington, D. C."